No. 781,472. Patented January 31, 1905.

UNITED STATES PATENT OFFICE.

JOSEPH TCHERNIAC, OF FREIBURG, GERMANY.

PROCESS OF MAKING CYANIDS.

SPECIFICATION forming part of Letters Patent No. 781,472, dated January 31, 1905.

Application filed August 8, 1904. Serial No. 220,043.

*To all whom it may concern:*

Be it known that I, JOSEPH TCHERNIAC, a subject of the Emperor of Germany, residing at Freiburg, in Breisgau, Empire of Germany, have invented certain new and useful Improvements in the Manufacture of Cyanids, of which the following is a specification.

In the specification to my United States Patent No. 747,271, dated December 15, 1903, is described a manufacture of cyanids by oxidizing a sulfocyanid and absorbing the hydrogen cyanid by a heated alkali carbonate or hydroxid.

My present invention relates to an improvement in the use of alkali hydroxid as an absorbent for the hydrogen cyanid.

I now find that in order to obtain a high-grade colorless cyanid the alkali hydroxid must be heated to a temperature below its melting-point, but above that at which the water generated by the reaction is completely vaporized. The hydroxid should be finely divided, and although the temperature must at first be below that at which the hydroxid melts it may be raised gradually as the latter becomes converted into cyanid. For instance, when caustic soda is used (best in thin slices or as powder) the temperature may be 200° centigrade to begin with. Some fifty to sixty per cent. of the caustic soda will become cyanid at this temperature. To complete the conversion, the temperature may be raised to 300° centigrade, which may be done without danger, as the melting-point of the mass rises considerably as the formation of cyanid proceeds. Instead of raising the temperature the mass may be broken up or ground (best in the absorption apparatus itself) and the temperature maintained at 200° centigrade until the soda is saturated. By working in this manner and using two or three absorption apparatus in series the soda is completely saturated and the hydrogen cyanid fully absorbed.

The cyanid produced is of high grade and quite white.

Having thus described the nature of this invention and the best means I know of carrying the same into practical effect, I claim—

1. In the manufacture of cyanids by absorbing hydrogen cyanid by an alkali hydroxid heating the latter to a temperature below its melting-point but above the temperature at which the water generated by the reaction is completely vaporized, substantially as described.

2. In the manufacture of cyanids by absorbing hydrogen cyanid by caustic soda, heating the latter first at a temperature of about 200° centigrade and then at about 300° centigrade, substantially as described.

In testimony whereof I have signed my name to this specification in the presence of two subscribing witnesses.

JOSEPH TCHERNIAC.

Witnesses:
LUDWIG GRINBUL,
BENJAMIN F. LIEFELD.